United States Patent [19]

Burnett et al.

[11] 4,430,283

[45] Feb. 7, 1984

[54] METHOD FOR THE EXTRUSION OF TETRAFLUOROETHYLENE POLYMER TUBES

[75] Inventors: Edward L. Burnett; Eugene V. Stack, both of Bay City, Mich.

[73] Assignee: The Dow Chemical Company, Midland, Mich.

[21] Appl. No.: 378,963

[22] Filed: May 17, 1982

Related U.S. Application Data

[63] Continuation-in-part of Ser. No. 206,212, Nov. 13, 1980, abandoned.

[51] Int. Cl.³ .............................................. B27J 5/00
[52] U.S. Cl. .................................... 264/127; 264/330
[58] Field of Search ........................................ 264/127

[56] References Cited

U.S. PATENT DOCUMENTS

| 2,847,711 | 8/1958 | Hibbard | 264/345 |
| 4,104,394 | 8/1978 | Okita | 264/127 |
| 4,203,938 | 5/1980 | Burnett et al. | 264/127 |

Primary Examiner—James R. Hall
Attorney, Agent, or Firm—R. B. Ingraham

[57] ABSTRACT

Tetrafluoroethylene polymer tubes suitable for the preparation of lined pipe are prepared by ram extrusion wherein the tube is extruded above the sinter temperature and cooled below its crystalline melting point while radially unsupported to provide a tube of improved dimensional stability under thermal cycling.

3 Claims, 1 Drawing Figure

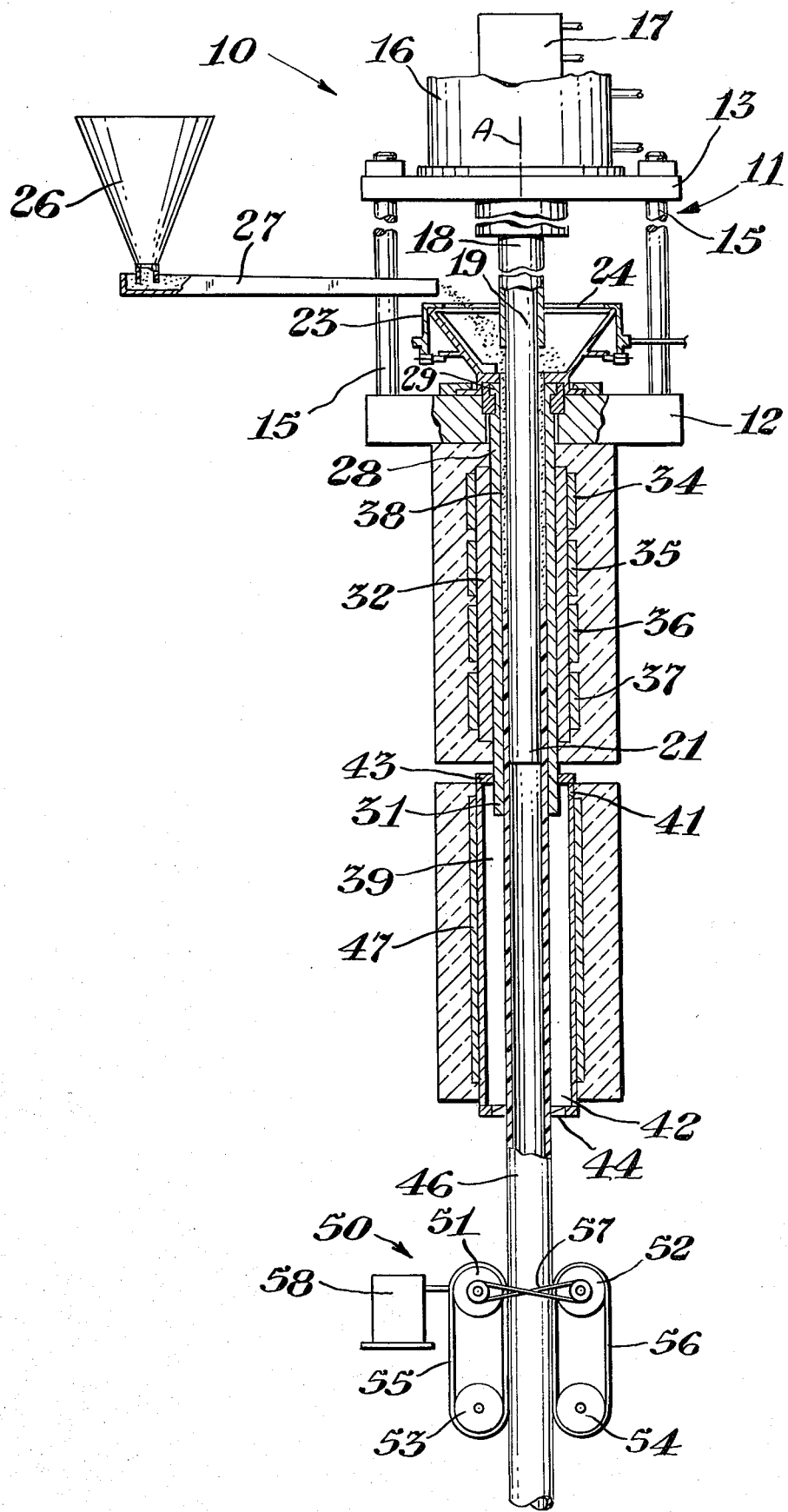

METHOD FOR THE EXTRUSION OF TETRAFLUOROETHYLENE POLYMER TUBES

This application is a continuation-in-part of the copending application Ser. No. 206,212, filed Nov. 13, 1980 now abandoned.

Plastic lined pipe has found wide use in industry for applications where corrosion of conventional metallic pipes and conduit is undesirable. Plastic lined pipe or conduit provides a desirable combination of properties wherein the piping has the mechanical properties of the outer steel or other metal jacket and the desirable chemical resistance of the plastic liner. Plastic lined pipe does not provide a universal solution to all problems. Generally, lined pipe is less resistant to temperature cycling than is an all metal conduit. With plastic lined pipe, it has been known that liners have failed after temperature cycling, and cold flow of the liner can occur when flanged joints are employed. Oftentimes, plastic lined conduit is subject to corrosion due to the permeation of gases having a corrosive nature through the plastic liner. Generally, such plastic lined conduits vent the region between the liner and the supporting metallic conduit to space exterior to the conduit to prevent collapse of the liner due to the accumulation of gases which have permeated through the liner toward the interior wall of the supporting metallic conduit. By the judicious selection of appropriate plastic liner material and operating conditions, such difficulties are minimized.

A particularly desirable plastic lining for plastic lined conduit for extremes in both temperature and the corrosive nature of the material being handled are tetrafluoroethylene polymers such as polytetrafluoroethylene. Polytetrafluoroethylene, although softened by heating, is not readily fabricated by conventional thermoplastic process techniques but conventionally is fabricated using the processing techniques generally resembling the techniques employed for the preparation of sintered metal articles. Oftentimes, particularly in the preparation of tubular articles from tetrafluoroethylene polymer, such techniques result in articles having less than the desired physical properties. Various techniques are known for the preparation of tetrafluoroethylene polymer tubes. However, such techniques do not necessarily provide a tube having the desirable physical properties for the lining of metallic conduit. In general, for the lining of metallic conduit, the plastic tube such as a tetrafluoroethylene polymer tube should exhibit maximum density thereby providing a tube having minimal gas or vapor permeability. Such extruded tubes for optimum performance as a pipe or conduit liner should exhibit, on heating, minor shrinkage and preferably minor expansion in the radial direction and minimal shrinkage in the axial dimension. Shrinkage in the radial direction oftentimes results in a liner which will shrink within the lined conduit and, therefore, not be positively positioned within the conduit. In other words, the liner is loose. Generally, if the liner on temperature cycling exhibits a tendency to shrink in the axial direction and has integral flanges formed at the terminal portions of the liner, stress is generally concentrated at locations where the liner is flanged generally radially outward at either end of the conduit. Such stress can result in the phenomenon frequently referred to as stress cracking, that is rupture of the liner adjacent the thermal flange portions thereof which permits fluid being conveyed by the conduit ready access to the metallic outer jacket or conduit frequently referred to as failure.

A wide variety of techniques have been employed in the fabrication of tetrafluoroethylene polymers. One such method is set forth in our U.S. Letters Pat. No. 4,203,938, issued May 20, 1980, wherein a polytetrafluoroethylene preform is formed from compacted polytetrafluoroethylene over a mandrel and the preform removed from the mandrel and sintered to provide a tube suitable for conduit lining.

Other processes for the preparation of tetrafluoroethylene polymer bodies are disclosed in U.S. Pat. No. 2,456,621 (Cheney, Jr.) wherein particulate polytetrafluoroethylene is pre-baked at a temperature from about 300° to 500° C. and subsequently extruded in a ram extruder to provide rods, tubes or coated wire.

U.S. Letters Pat. No. 2,685,707 (Llewellyn et al.) discloses the preparation of extruded polytetrafluoroethylene by admixing the tetrafluoroethylene polymer with about 5 to 50 weight percent of an organic liquid and subsequently sintering the preform obtained by extrusion.

U.S. Letters Pat. No. 2,847,711 (Hibbard) discloses the fabrication of polytetrafluoroethylene by, in essence, compacting polytetrafluoroethylene powder into a preform, for example, by compression molding, subsequently heating the preform in a second mold to a temperature above about 620° F. (about 327° C.) to obtain a desired tetrafluoroethylene polymer article.

U.S. Letters Pat. No. 2,945,265 (Sell. Jr. et al.) discloses a method for the preparation of insulated wire wherein a ram extruder extrudes a mixture of tetrafluoroethylene polymer and a volatile organic material over a wire. The volatile organic material is removed by heating and the residual polytetrafluoroethylene is sintered on the wire in a sintering oven.

U.S Letters Pat. No. 3,045,288 (Sykora) discloses that formed polytetrafluoroethylene articles may be annealed by maintaining the article just below a gel temperature of 617° F. (325° C.) for a period sufficiently long to stabilize the dimensional changes and subsequently cooling the article to room temperature.

U.S. Letters Pat. No. 3,068,513 (Chaffin) discloses the ram extrusion of a polytetrafluoroethylene sheet wherein a plurality of temperature control zones are employed. Rod stock may also be employed using this technique.

U.S. Letters Pat. No. 4,104,394 (Okita) discloses a heat shrink polytetrafluoroethylene polymer tube prepared by extrusion. The tube is subsequently heated, inflated and cooled in the inflated condition.

In the publication "Research Disclosure" of January 1978, entry number 16508, it is disclosed that various fluorocarbon resins such as TEFLON FEP and PFA fluorocarbon resins may be extruded using relatively high temperatures at the die to result in decreased melt fracture. The term "TEFLON" is a trade designation for polytetrafluoroethylene. FEP is generally regarded as an abbreviation for fluorinated ethylene propylene copolymers and PFA is an abbreviation for perfluoroalkoxy polymers.

The problem of tube extrusion is described in great detail in the ICI Technical Service note F2, Third edition, concerning "FLUON" polytetrafluoroethylene by the Molding Powders Group ICI Plastics Division, Welwyn Garden City, Herts, England; published July 1974. The ICI publication, page 6 thereof, discloses that polytetrafluoroethylene desirably may be extruded in an extruder having four heating zones, each separately controlled and having temperatures of 370° C. (inlet), 400° C., 400° C. and 350° C. (outlet). A similar disclosure is set forth on pages 8, 9 and 11. A desirable arrangement of a ram extruder is set forth on page 19 wherein a generally downwardly extending ram tube extruder is disclosed and four heating zones are employed. On page 24, Table 11, the publication sets forth that desirable extrusion temperature for 60 to 50 millimeter diameter tubing is 380° C., 400° C., 400° C. and 300° C., respectively, as the extrusion progresses.

It would be desirable if there were available an improved method and apparatus for the preparation of polytetrafluoroethylene polymer.

It would also be desirable if there were available an improved method and apparatus for the preparation of tetrafluoroethylene polymer tubes exhibiting minimal shrinkage.

It would also be desirable if there were available an improved method and apparatus for the preparation of tetrafluoroethylene polymer tubing having minimal radial and axial shrinkage as well as a desirable resistance to the permeation of gases therethrough.

These benefits and other advantages in accordance with the present invention are achieved in a method for the fabrication of tetrafluoroethylene tubes or articles wherein tetrafluoroethylene polymer resins in the form of polytetrafluoroethylene particles are ram extruded in a ram extruder to generally fuse together the polytetrafluoroethylene particles at a temperature above the crystalline melting point of the particles to provide a coherent tetrafluoroethylene polymer tube, discharging the coherent tetrafluoroethylene polymer tube from the extruder and subsequently cooling the tetrafluoroethylene polymer tube to a self supporting condition, the improvement which comprises discharging the tetrafluoroethylene polymer tube from the extruder at a temperature above its crystalline melting point, cooling the tube below its crystalline melting point while the tube is radially unsupported and axially supported, thereby providing a tetrafluoroethylene polymer tube of reduced tendency to shrink in radial and axial directions, and having a desirable resistance to permeation of gases therethrough.

Also contemplated within the scope of the present invention is an apparatus for the extrusion of tetrafluoroethylene polymer into a tubular article having a reduced tendency to shrink in radial and axial directions and a desirable resistance to permeation of gases therethrough, the apparatus comprising a downwardly extruding ram extruder having a plurality of heating zones, the heating zones being capable of maintaining tetrafluoroethyelne polymer being extruded therethrough at a temperature above its crystalline melting point, the extruder having a downwardly facing discharge end, the improvement which comprises a heated chamber disposed adjacent the discharge end and adapted to receive and pass therethrough a tetrafluoroethylene polymer tube from the extruder and to cool the tube below its crystalline melting point, a tetrafluoroethylene polymer takaway means adapated to engage a tube extruded from the extruder at a location remote from the extruder and the heated chamber to support the extruded tube and generally prevent elongation thereof within the heated chamber.

Further features and advantages of the present invention will become more apparent from the following specification taken in connection with the drawing wherein the FIGURE shows a schematic partially in section view of an apparatus in accordance with the invention.

In the FIGURE, there is schematically represented a partially in section view of an apparatus designated by the reference numeral 10. The apparatus of 10 is suitable for the practice of the method of the present invention. The apparatus 10 comprises in cooperative combination a frame 11. The frame 11 comprises a lower terminal plate 12 and an upper terminal plate 13. The plates 12 and 13 are interconnected by means of tie bars 15 (only 2 of 4 shown). The upper plate 13 has disposed thereon a first linear actuator 16 such as a hydraulic cylinder which is in operative communcation with a motor source not shown. An actuator 16 is generally disposed centrally in the plate 13 and external to the frame 11. A second linear actuator 17 is generally centrally disposed on the actuator 16 and is in operative communication with a motor source not shown. The linear actuator 16 has affixed thereto a hollow cylindrical ram 18, the ram 18 being selectively positionable along an axis of extrusion A. The axis of extrusion A is generally centrally disposed with respect to the frame 11 and extends generally parallel to the tie bars 15. The linear actuator 17 has affixed thereto a mandrel 19, the mandrel 19 being slidably disposed partially within the ram 18. The mandrel 19 is generally coaxially disposed with the axis of extrusion. The mandrel 19 has a terminal end 21 remotely disposed from the linear actuator 17 and extending through the lower plate 12. The lower plate 12 has affixed thereto a jacketed feed hopper 23. The feed hopper 23 has a generally frustoconical configuration. The feed hopper 23 being disposed between plates 12 and 13 and having its major dimension at an open end 24 generally adjacent facing plate 13. A powder feed means 26 is affixed thereto. A powder delivery means or chute 27 extends from the powder feed means 26 to the open end 24 of the hopper 23. A generally cylindrical extrusion barrel 28 has a first end 29 and a discharge end 31. The inlet end 29 of the barrel 28 extends through plate 12 and is in communication with the hopper 23. The discharge end 31 of the barrel 28 is external to the frame 11 and remote from plate 13. The barrel 28 external to the frame 11 has disposed thereon a thermally conductive jacket 32. The jacket 32 has disposed thereon a plurality of heat means such as band heaters designated by the reference numerals 34, 35, 36 and 37. The heaters 34, 35, 36 and 37 provide four heating zones for the barrel 28: the first heating zone being generally commensurate with the region encircled by the heater 34; the second zone being generally commensurate with the region encircled by the heater 35; the third zone being generally commensurate with the region encircled by the heater 36; and the fourth or terminal heating zone being generally commensurate with the region encircled by the heater 37. The barrel 28 and the mandrel 21 define an annular space 38 therebetween. A heating chamber 39 is disposed adjacent the discharge end 31 of the barrel 28. The chamber 39 has an inlet end 41. A first sealing means 43 is disposed at end 41 and a second sealing means 44 is disposed at end 42. The sealing means 43 is in sealing engagement with the discharge end 31 of barrel 28 and the sealing means 44 is optionally adapted to engage a tube discharged from the barrel 28, such as tube 46. The heating chamber 39 has thermal energy supply means 47 such as an electrical heater. For ease of illustration, the apparatus as shown in the FIGURE is shown without hydraulic and electrical controls which are conventional and well known in the art. With the exception of the heating chamber 39, the apparatus 10 is generally similar to the apparatus disclosed in U.S. Pat. No. 3,456,294, Good et al. The teaching of the Good et al. and other references hereinbefore cited are incorporated by reference thereto.

In operation of the apparatus in accordance with the present invention, tetrafluoroethylene powder is fed from the supply means 26 through a chute or trough 27 into the hopper 23.

Advantageously, the powder is distributed about the adjacent portion of the mandrel 21 whereupon the ram 18 is forced by the linear actuator 16 toward plate 12 compacting the powder and forcing it into the annular space 38. The ram 18 is then withdrawn toward plate 13, an additional supply of powder applied about the mandrel 21 in the hopper 23 and the ram 18 is again forced toward plate 12 compacting the powder and forcing it further into the annular space 38. By continually repeating the process, powder is forced through the annular space 38 where it is heated to a temperature above the crystalline melting point sufficient to sinter it and form a unitary tubular body. Optionally, the mandrel 21 may be reciprocated along the axis A either simultaneously with the ram 18 or alternatively when the ram 18 is extended toward the plate 12 and maintained in that position. The mandrel 21 may be withdrawn from a portion of the tube, for example by a movement about equivalent to the increase in the length of the tube 46 caused by one stroke of the ram 18. The mandrel 21, if withdrawn, is then forwarded with the tube 46 as the ram 18 is moved toward plate 12. Disposed remote from the frame 11 and generally adjacent the frame 39 is a tube support and takeaway means generally designated by the numeral 50. The takeaway means comprises a first pair of rolls 51 and 52. The rolls 51 and 52 are disposed on opposite sides of the tube 46 and have their axes of rotation in a plane generally normal to the axis of extrusion A. A second pair of rolls 53 and 54 are disposed generally parallel to rolls 51 and 52. A tube engaging belt 55 passes over rolls 51 and 53 and a second tube engaging belt 56 passes over rolls 52 and 54. A driving belt 57 engages rolls 51 and 52 to assure equal surface speed of the belts 55 and 56. A drive means, such as a gear head motor 58, is in operative engagement with roll 51.

In the practice of the method of the present invention, the heaters 34, 35, 36 and 37 are maintained at a temperature such that the tube 46 on leaving the discharge end 31 of the barrel 28 is above its crystalline melting point. Typically, for the extrusion of polytetrafluoroethylene, the first heating zone is maintained at a temperature of about 225° C, the second heating zone at a temperature of about 350° C., the third heating zone at a temperature of about 425° C. and the fourth heating zone at a temperature of about 410° C. The heating chamber 39 typically ranges from about 300° C. at a location adjacent to the discharge end 31 of the barrel 28 to about 250° C. adjacent the discharge end 42 of the chamber 39. For most tube extrusion using polytetrafluoroethylene, the length of chamber 39 may be about one foot for an extrusion rate of about two inches per minute and the temperature of the extruded tube 46 as it leaves the chamber 39 is about 275° C.

As the tube 46 exits from the chamber 39, it is engaged by the takeaway means 50 wherein the belts 55 and 56 are moved at a rate equal to the extrusion rate of the tube 46 to thereby axially support the tube 46 in the chamber 39 so that the tube 46 may cool below its crystalline melting point while it is radially unsupported.

In accordance with the present invention, when a tube such as the tube 46 is cooled below its crystalline melting point without significant axial compression or expansion, substantial improved gas barrier properties are obtained.

By way of further illustration, polytetrafluoroethylene was extruded employing an apparatus generally as illustrated in the FIGURE with and without the chamber 39. Tubing extruded without the chamber 39 was about 2 inches in diameter and had a wall thickness of about one-eighth inch. Three samples of such tubing had the following tensile strength in pounds per square inch (psi) and elongation in percent:

|  |  |  |
| --- | --- | --- |
| Sample 1 | 2613 | 194 |
| Sample 2 | 2413 | 140 |
| Sample 3 | 2738 | 188 |

In the extrusion without the chamber 39, the temperature of the fourth zone (37) was about 300° C. In comparison, employing the chamber 39 with the first heating zone at 225° C., second zone at 350° C., third zone at 425° C. and fourth zone at 410° C., the chamber 39 had a temperature of 296° C. adjacent the discharge extruder and 250° C. at the lowermost portion of the chamber. Tensile strength in psi, elongation % and density of three samples were as follows:

|  |  |  |  |
| --- | --- | --- | --- |
| Sample 1 | 3515 | 302% | 2.164 |
| Sample 2 | 3414 | 318% | 2.159 |
| Sample 3 | 3605 | 324% | 2.151 |

The helium permeation rate of tubing in accordance with the present invention at 50° C. was about 4,700 cubic centimeters (standard temperature and pressure) per mil per hundred square inches per 24 hours per atmosphere, whereas the permeability for tubing extruded without the chamber was 14,000 cubic centimeters, (standard temperature and pressure) per mil per hundred square inches per 24 hours per atmosphere. Tubing extruded employing the chamber 39 showed an axial shrinkage of about 3 percent while tubing extruded without employing the chamber shows an axial shrinkage of about 8 percent. Tubing extruded with the chamber 39 showed a diametrical expansion of about 1.5 percent, which is highly desirable when tubing is employed to lined pipe, whereas tubing extruded without the chamber such as the chamber 39 showed a shrinkage of about 3 percent, a phenomenon that is undesirable when such tubing is used for lining piping.

In a manner similar to the foregoing, other tetrafluoroethylene polymers are readily extruded to form desirable tubing having excellent physical properties.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a method for the fabrication of a tetrafluoroethylene article wherein tetrafluoroethylene polymer resins in the form of polytetrafluoroethylene particles are ram extruded in a ram extruder to generally fuse together the polytetrafluoroethylene particles at a temperature above the crystalline melting point of the particles to provide a coherent tetrafluoroethylene polymer tube, discharging the coherent tetrafluoroethylene polymer tube from the extruder and subsequently cooling the tetrafluoroethylene polymer tube to a self supporting condition, the improvement which comprises discharging the tetrafluoroethylene polymer tube from the extruder at a temperature above its crystalline melting point, cooling the tube below its crystalline melting point while the tube is radially unsupported and axially supported, thereby providing a tetrafluoroethylene polymer tube of reduced tendency to shrink in radial and axial directions, and having a desirable resistance to permeation of gases therethrough.

2. The method of claim 1 wherein the article is a tube.

3. The method of claim 2 wherein the tube is extruded generally vertically downwardly.

* * * * *